United States Patent [19]
Kimura et al.

[11] Patent Number: 5,540,560
[45] Date of Patent: Jul. 30, 1996

[54] COMPRESSOR WITH ROTATION DETECTING MECHANISM

[75] Inventors: Kazuya Kimura; Hiroaki Kayukawa; Kenji Takenaka; Yoshihiro Fujisawa, all of Kariya, Japan

[73] Assignee: Kabushiki Kaisha Toyoda Jidoshokki Seisakusho, Aichi, Japan

[21] Appl. No.: 227,137

[22] Filed: Apr. 13, 1994

[30] Foreign Application Priority Data

Apr. 14, 1993 [JP] Japan .................................. 5-087368
Apr. 19, 1993 [JP] Japan .................................. 5-091219
Jul. 6, 1993 [JP] Japan .................................. 5-166832

[51] Int. Cl.$^6$ ........................... F04B 47/06; F04B 27/08
[52] U.S. Cl. ................................. 417/223; 417/63
[58] Field of Search ............................... 417/63, 223

[56] References Cited

U.S. PATENT DOCUMENTS

| | | |
|---|---|---|
| 4,355,959 | 10/1982 | Kono et al. . |
| 4,393,966 | 7/1983 | Kono et al. . |
| 4,704,072 | 11/1987 | Nakajima et al. ............. 417/223 |
| 4,737,079 | 4/1988 | Kurosawa et al. ............. 417/223 X |
| 4,781,538 | 11/1988 | Daikohara ...................... 417/223 |
| 5,100,301 | 3/1992 | Hidaka et al. . |
| 5,380,161 | 1/1995 | Takenaka et al. ............. 417/223 X |
| 5,391,058 | 2/1995 | Goto .............................. 417/223 |

FOREIGN PATENT DOCUMENTS

| | | |
|---|---|---|
| 2753738 | 6/1979 | Germany . |
| 3130338 | 4/1982 | Germany . |
| 3801171 | 5/1989 | Germany . |
| 4015006 | 11/1990 | Germany . |
| 63-222217 | 9/1988 | Japan . |
| 2156906 | 10/1985 | United Kingdom . |

*Primary Examiner*—Richard E. Gluck
*Attorney, Agent, or Firm*—Burgess, Ryan & Wayne

[57] ABSTRACT

A compressor including a rotation detecting device for detecting the rotation of the compressor to stop the compressor in an emergency. The rotation detecting device comprises a fastening bolt fastening the casing sections together, a rotatable member supported by a drive shaft, and a magnetic sensor arranged outside the casing around the head of the fastening bolt. A magnetic flux is guided from a magnetic clutch to the rotatable member or provided by permanent magnets on the rotatable member. The rotatable member has a notch or a projection for producing periodically changing a magnetic flux which passes through the fastening bolt and is detected by the magnetic sensor.

7 Claims, 11 Drawing Sheets

COMPRESSOR WITH ROTATION DETECTING MECHANISM

BACKGROUND OF THE INVENTION

1. Field of the Invention

The present invention relates to a compressor having a rotation detecting mechanism for detecting an unusual situation.

2. Description of the Related Art

Compressors for compressing gas, especially compressors used in automobile refrigerating systems must be constructed in a hermetic structure. When a compressor fails to rotate due to, for example, frictional overheating or attempting to compress a liquid fluid, it is necessary to rapidly disconnect the compressor from its driving system with a drive source (for example, an engine) to prevent damage to the automobile power train. Especially, in a compressor driven by a driving system which also drives auxiliary devices of an automobile such as a water pump and an alternator, via a magnetic clutch, it is important to turn the magnetic clutch off as soon as an unusual situation occurs so that the auxiliary devices are not affected by the damaged compressor. Accordingly, the compressor conventionally includes a rotation detecting mechanism for detecting an unusual situation of the compressor so as to turn the magnetic clutch off to disconnect the compressor from its driving source when the rotation of the compressor falls below a predetermined value.

For example, Japanese Examined Utility Model Publication (Kokoku) No. 3-6878 discloses a wobble plate type compressor including a rotation detecting mechanism which comprises a magnetic circuit formed such that a magnetic flux leaking from a magnetic clutch is guided to a bearing race of a rotatable member of the compressor via a drive shaft, and a magnetic sensor (a magnetic transducer arranged in the casing of the compressor for cooperation with the rotatable member. A projection is arranged on the periphery of the bearing race so that the projection periodically moves across the magnetic sensor and the latter can periodically detect a change in the magnetic flux with the rotation of the rotatable member.

Japanese Unexamined Utility Model Publication (Kokai) No. 58-73991 discloses a slide vane type compressor including a rotation detecting mechanism which comprises a magnetic circuit formed such that a magnetic flux leaking from a magnetic clutch is guided to an iron core of a sensor via a drive shaft and a rotor (vane), the sensor being arranged in the casing of the compressor so as to face the end face of the rotor (vane) to thus detect a change in a magnetic flux in a manner similar to the previous case.

In the detection of the rotation of the compressor having a hermetic structure, a passage of detected signals, a space for mounting a magnetic sensor, and an output level of detected signals must be taken into consideration. If the sensor and/or its cables extend from the interior to the exterior of the compressor through the casing, a sealing arrangement must be added to a mounting place of the sensor and/or its cables. Also, if the detection of the rotation of the compressor is carried out by using a drive shaft or a pulley cooperating with the drive shaft, it is difficult to find a mounting place for a magnetic sensor in the casing of the compressor. Also, if a sensor is arranged outside the casing of the compressor and the magnetic sensor must detect a change in a magnetic flux which appears within the casing of the compressor, through the wall of the casing of the compressor, an output level of detected signals from the magnetic sensor will be low.

In view of these considerations, the rotation detecting mechanisms of the above described prior arts have an economical disadvantage because a special sealing arrangement must be added. Also, in the first described prior art, it is difficult to form a closed magnetic circuit because the magnetic sensor is arranged at a position remote from the magnetic clutch and the sensitivity of the sensor is low.

SUMMARY OF THE INVENTION

The object of the present invention is to provide a compressor having a rotation detecting mechanism which does not necessitate a special sealing arrangement, can output signals of a sufficient level, and is particularly adapted for use in an automobile refrigerating system.

According to the present invention, there is provided a compressor comprising a casing including a plurality of casing sections, and fastening means for hermetically fastening the casing sections together, the fastening means having an outer portion located outside the casing. A drive shaft is rotatably inserted in the casing and operatively connected to a drive source, and a rotatable member is supported by the drive shaft for movement with the drive shaft for compressing a fluid in the casing, the rotatable member having a periphery. Means is arranged for providing a magnetic flux on the periphery of the rotatable member. The rotatable member and the fastening means are arranged such that a magnetic circuit is formed from said means for providing a magnetic flux to the fastening means and a magnetic flux passing through the fastening means periodically changes with the rotation of the rotatable member. Detecting means is arranged outside the casing near the outer portion of the fastening means for detecting a magnetic flux passing through the fastening means, whereby a rotation of the compressor is detected based on the detection of a magnetic flux.

With this arrangement, a magnetic circuit is formed from the means for providing a magnetic flux on the rotatable member to the fastening means such as a fastening bolt which extends through the casing and has a head located outside the casing. Detecting means is arranged outside the casing near the outer portion of the fastening means (the head of the fastening bolt). A magnetic flux passes from the means for providing a magnetic flux to the fastening means, and to the outer portion thereof. Accordingly, it is possible to detect the magnetic flux by the detecting means and to thereby detect a rotation of the compressor, with a sufficient signal level, and without a special seal arrangement for the rotation detecting means.

Preferably, the drive shaft is connected to the drive source such as an engine of an automobile via a magnetic clutch, and said means for providing a magnetic flux comprises a material of the drive shaft and the rotatable member to guide a magnetic flux leaking from the magnetic clutch to the rotatable member via the drive shaft. In this case, the drive shaft and the rotatable member are preferably made at least partly from a ferromagnetic material.

Preferably, the magnetic clutch comprises a stator fixedly supported by the casing and a rotor, and the detecting means is arranged on or near the stator of the compressor. In this case, the detecting means comprises a magnetic transducer arranged on the casing so as to surround the head of a bolt as the fastening means. Alternatively, the detecting means comprises a magnetic transducer carried by the stator of the magnetic clutch so as to face the head of the bolt.

Preferably, wherein the periphery of the rotatable member is generally circular with at least one radial projection so that a magnetic flux in the magnetic circuit periodically changes with the rotation of the rotatable member. Alternatively, the periphery of the rotatable member is generally circular with at least one radial notch so that a magnetic flux in the magnetic circuit periodically changes with the rotation of the rotatable member.

Preferably, said means for providing a magnetic flux comprises at least one permanent magnet fixed to the rotatable member. The at least one permanent magnet is arranged to radially project from the periphery of the rotatable member.

Preferably, the detecting means comprises a pair of detecting means arranged at different circumferential positions and a detecting circuit means for detecting a difference between outputs from the pair of detecting means to thereby detect at least one of the rotation and the rotational angle of the rotatable member in response to the difference.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
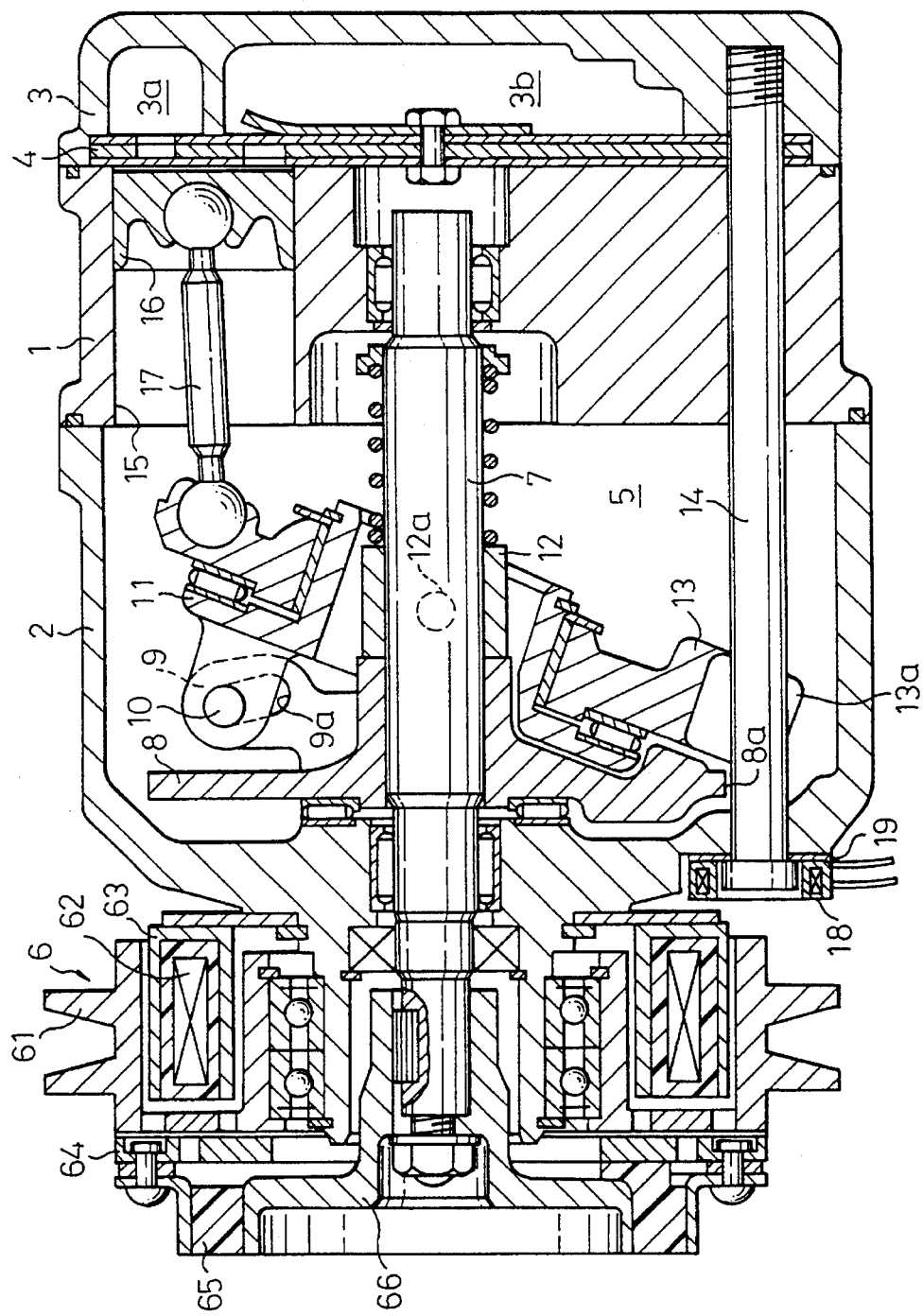
FIG. 1 is a cross-sectional view of a compressor according to the first embodiment of the present invention.
Figure 3:
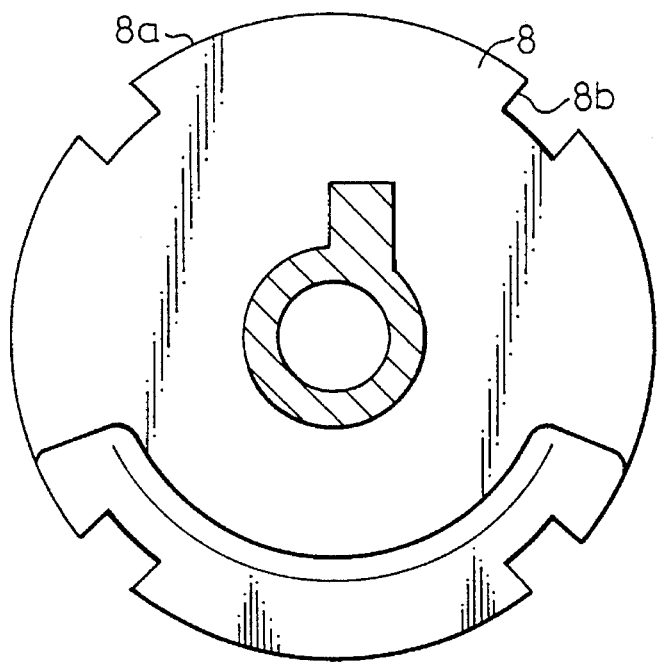
FIG. 3 is a partially cross-sectional, front view of the rotatable base member of FIG. 1.

FIGS. 1 and 3 show a compressor according to the first embodiment of the present invention. The compressor comprises a casing comprising a cylinder block 1 and a front housing 2 coupled to the front of the cylinder block 1. A rear housing 3 having a suction chamber 3a and a discharge chamber 3b is coupled to the rear of the cylinder block 1 via a valve plate 3. A plurality of fastening bolts (only one is shown in FIG. 1) 14 extend from the front housing 2 through the cylinder block 1 to the rear housing 3 to fasten these casing sections together. Each of the bolts 14 has a head located outside the front housing of the casing.

A drive shaft 7 is rotatably inserted in a crank chamber 5 formed in the front housing 2. The drive shaft 7 is rotatably supported by bearings arranged in the cylinder block 1 and the front housing 2, and a magnetic clutch 7 is attached to an outer portion of the drive shaft 7. The drive shaft 7 can be operatively connected to an engine (not shown) of an automobile via the magnetic clutch 7 and belts (not shown).

A circular rotatable base member 8 is fixedly supported by the drive shaft 7 for movement therewith. The rotatable base member 8 has a support arm 9 extending rearwardly from the rotatable base member 8, and the support arm 9 has an elongated hole 9a into which a pin 10 is slidably engaged. A swash plate 11 is attached to the pin 10 so that the swash plate 11 can rotate with the rotatable base member 8 and pivotally move about the axis of the pin 10.

A sleeve 12 is movably attached to the drive shaft 7 adjacent to the rear end of the central boss portion of the rotatable base member 8. The sleeve 12 has diametrically opposed pivot pins 12a which are received by holes (not shown) of the swash plate 11, respectively, whereby the swash plate 11 can pivotally move about the axis of the pin 10. A wobble plate 13 is supported by the swash plate 11 via bearings so that the wobble plate 13 is rotatable relative to the swash plate 11. The wobble plate 13 has a stopper block 13a which engages with one of the fastening bolts 14 to restrict the rotation of the wobble plate 13.

The cylinder block 1 has a plurality of parallel bores 15 (only one shown in FIG. 1) into which pistons 16 are slidably inserted, respectively. Connecting rods 17 connect the wobble plate 13 and each of the pistons 16. Accordingly, the rotational movement of the drive shaft 7 is converted to the reciprocating wobble movement of the wobble plate 13 so that each piston 16 reciprocally move in the associated cylinder bore 15 to suck gas, i.e., gaseous coolant, from the suction chamber 3a and compress gas and discharge it into the discharge chamber 3b.

The magnetic clutch 6 comprises a rotor 61 rotatably supported on a central boss portion of the front housing 2 and connected to the engine by belts (not shown), a stator 63 fixedly supported by the front housing 2 and having a solenoid coil 62 inserted in an annular groove of the rotor 61, an armature 64 arranged in a facing relationship with a frictional coupling surface of the rotor 61, and a hub 66 with cushion members 65 to connect the armature 64 to the drive shaft 7.

The drive shaft 7, the rotatable base member 8 and the fastening bolts are made from ferromagnetic material (iron based metal). The rotatable base member 8 and one of the fastening bolts 14 (which is shown in FIG. 1) are designed so that the circular peripheral surface 8a of the rotatable base member 8 is in proximity to the fastening bolt 14 so that a magnetic circuit is formed from the rotatable base member 8 to the fastening bolt 14. A magnetic flux is provided to the rotatable base member 8 from the magnetic clutch 6. That is, a magnetic flux leaking from the magnetic clutch 6 is guided to the rotatable base member 8 via the drive shaft 7, and then to the fastening bolt 14. The rotatable base member 8 has on the periphery thereof four notches 8b so that a magnetic flux passing from the rotatable base member 8 to the fastening bolt 14 periodically changes with the rotation of the rotatable base member 8. The head of the fastening bolt 14 is arranged in proximity with the magnetic clutch 6, and accordingly, a low reluctance magnetic circuit is formed from the magnetic clutch 6, the drive shaft 7, the rotatable base member 8, the fastening bolt 14 and again the magnetic clutch 6.

A magnetic sensor 18 is arranged outside the front housing 2 (the casing) near the head of the fastening bolt 14 for detecting a magnetic flux passing through the fastening bolt 14, whereby a rotation of the compressor is detected based on the detection of the magnetic flux. The magnetic sensor 18 comprises a known magnetic transducer comprising a coil for picking up a magnetic flux. The coil of the magnetic sensor 18 is attached to a washer 19 so as to surround the head of the fastening bolt 14.

Figure 4:
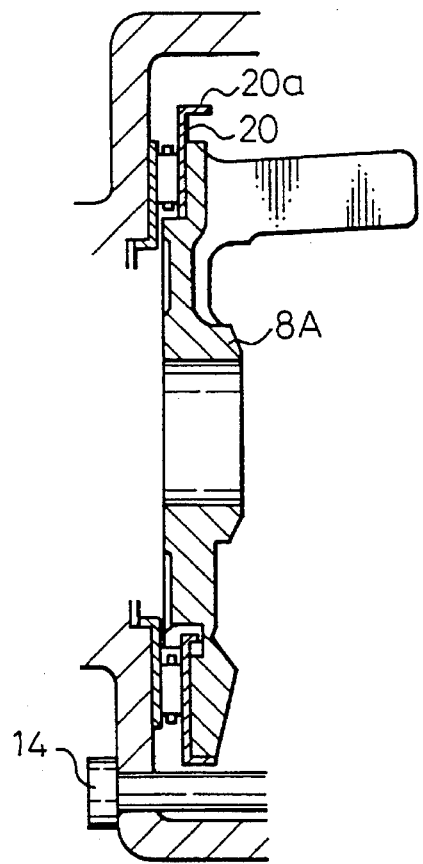
FIG. 4 is a cross-sectional view of a modified portion including a rotatable base member of a similar compressor.
Figure 5:
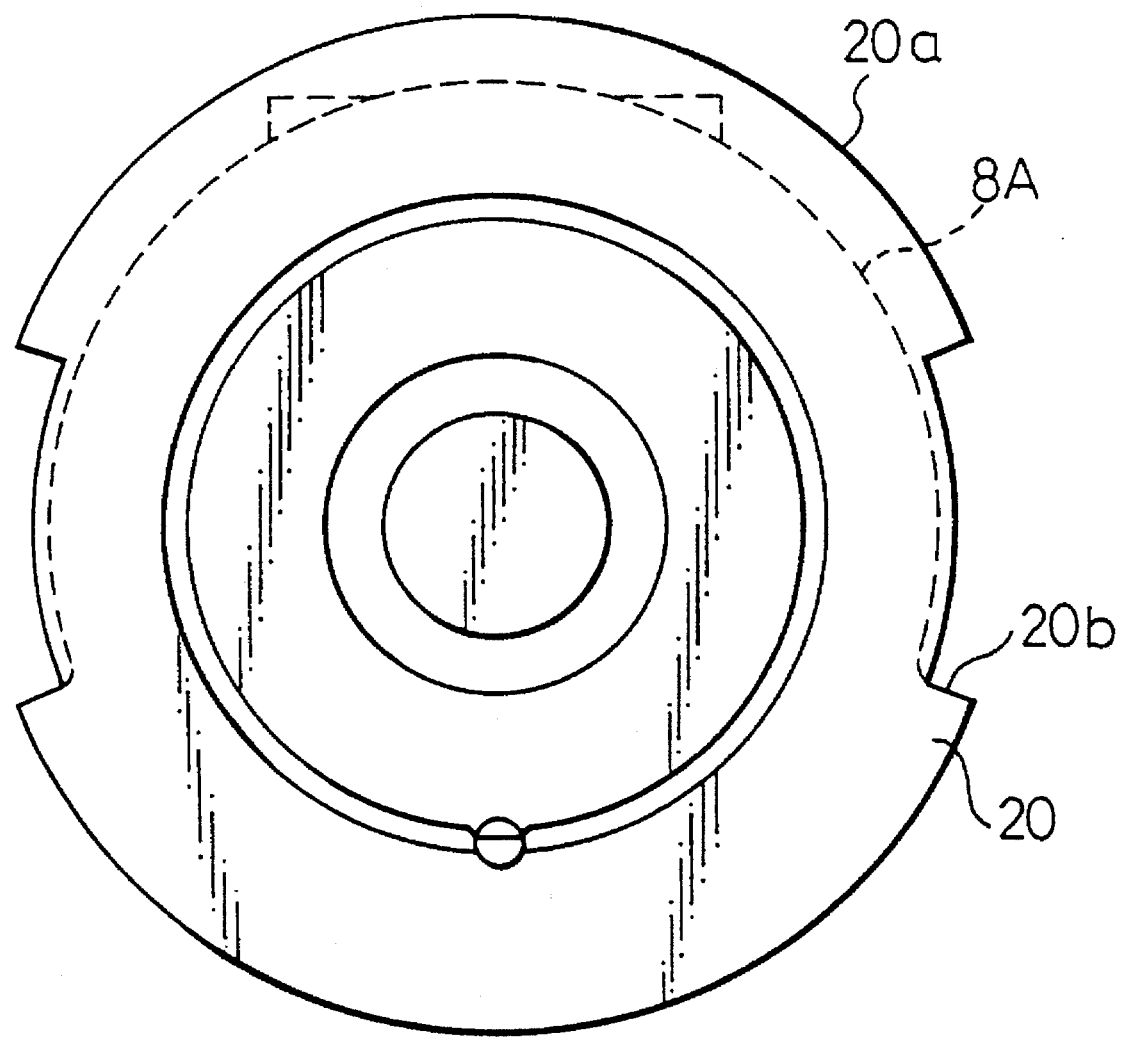
FIG. 5 is a front view of the portion of FIG. 4.

The rotatable member described in the appended claims is not restricted to the rotatable base member 8. According to the present invention, it is important to cause a periodically and distinctly changing a magnetic flux between the rotatable member and the fastening bolt 14. As shown in FIGS. 4 and 5, if the rotatable base member 8A is not formed in a completely circular shape due to balancing of the weight thereof and the rotatable base member 8A is not adapted for the rotatable member in the rotation detecting mechanism, it is possible to use a bearing race 20 of the thrust bearing on the side of the rotatable base member 8A as the rotatable member for the rotation detecting mechanism. In this case, the bearing race 20 is extended radially outwardly and a cylindrical flange 20a is formed on the periphery of the bearing race 20 around the rotatable base member 8A. Notches 20b are formed in the cylindrical flange 20a.

In operation, when the magnetic clutch 6 is turned on, the drive shaft 7 is rotated by the drive source (engine) and the rotational movement of the rotatable base member 8 and the swash plate 11 is converted to the reciprocating wobble movement of the wobble plate 12 so that each piston 16 reciprocally move in the associated cylinder bore 15 to thus effect compression work.

During this operation, a magnetic flux leaking from the magnetic clutch 6 passes through the drive shaft 7, the rotatable base member 8, and the fastening bolt 14 to form a magnetic circuit. Magnetic flux is temporarily reduced each time when one of the notches 8b on the circular peripheral surface 8a of the rotatable base member 8 faces the fastening bolt 14 and a magnetic flux is increased and restored to a normal values when the circular peripheral surface 8a of the rotatable base member 8 faces the fastening bolt 14. It is possible to arrange projections on the circular peripheral surface 8a of the rotatable base member 8 in place of the notches 8b.

The magnetic sensor 18 arranged around the head of the fastening bolt 14 outputs voltage pulses based on this change in a magnetic flux, whereby a rotation of the compressor is exactly detected by processing the pulses. It is needless to say that means for turning the magnetic clutch 6 off when an unusual situation is detected, such as an abnormal decrease in the detected pulses or an interruption of the pulses, is provided to prevent damage to the compressor and auxiliary devices.

Figure 2:
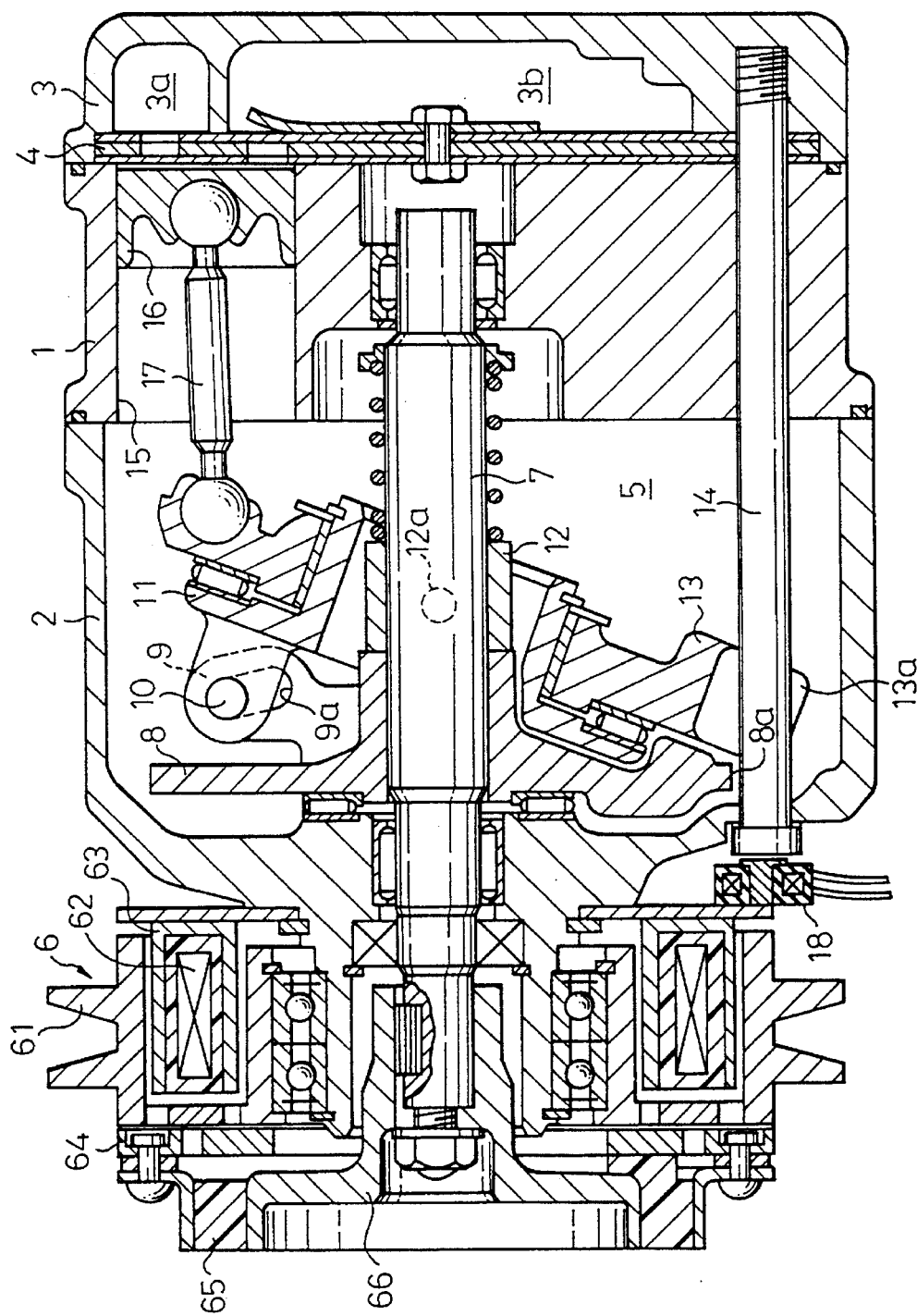
FIG. 2 is a cross-sectional view of a modified compressor similar to the compressor of FIG. 1.

The modified embodiment shown in FIG. 2 includes a magnetic sensor 18 which is carried by the stator 63 of the magnetic clutch 6 so as to face the head of the fastening bolt 14. The other components and a rotation detecting function are similar to those of the embodiment of FIG. 1.

The above embodiments are described with reference to the wobble plate type compressor, but it is possible to apply the present invention to the other types of compressors. For example, in a swash plate type compressor having a swash plate made from a nonferromagnetic material (aluminum alloy), it is possible to embed a ferromagnetic material in a part of the swash plate so that the ferromagnetic material radially extends just from the drive shaft to the outer periphery of swash plate so as to face the fastening bolt. Also, in a vane type compressor, it is possible to form a magnetic circuit by making the drive shaft, the rotor, vanes, and the fastening bolt from a ferromagnetic material to detect the rotation of the compressor in a manner described above. Also, if a gap between the head of the fastening bolt and the stator of the magnetic clutch is considerably large due to a requirement of design, for example, it is possible to adjust a gap between the head of the fastening bolt and the stator of the magnetic clutch, by changing the height of the head of the fastening bolt, or by adding an auxiliary element extending from the magnetic clutch toward the head of the fastening bolt, so as to reduce a magnetic resistance and to thereby increase the output from the magnetic sensor.

As explained above, according to the present invention, it is possible to arrange the magnetic sensor outside the casing of the compressor and the sensor can be easily attached to the casing with a simple attachment structure without a special seal structure, since a magnetic circuit is formed by the use of the fastening means.

Since a periodic change in a magnetic flux is caused between the opposing portions of the rotatable member and the fastening means and the latter can be arranged without interference with other component such as a portion of the casing, it is possible to reduce a gap between the rotatable member and the fastening means as small as possible to enhance a detecting sensitivity. By arranging the magnetic sensor around the head of the fastening bolt, it is possible to simultaneously accomplish the assembly work of the casing of the compressor and the attachment of the magnetic sensor. By arranging the magnetic sensor on the stator of the magnetic clutch, it is possible to accomplish the assembly work of the casing of the compressor independently of the attachment of the magnetic sensor.

Figure 6:
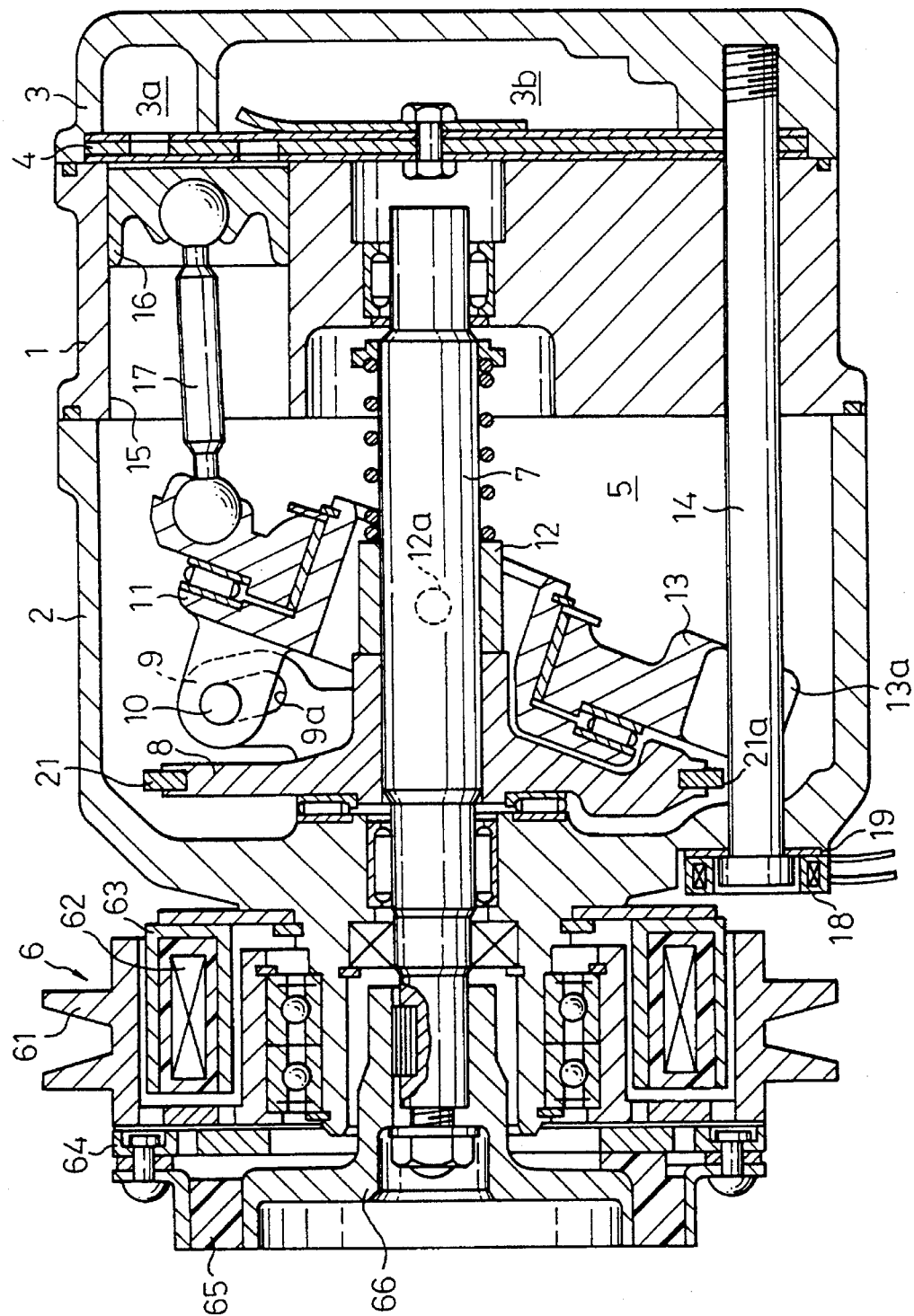
FIG. 6 is a cross-sectional view of a compressor according to the second embodiment of the present invention.
Figure 7:
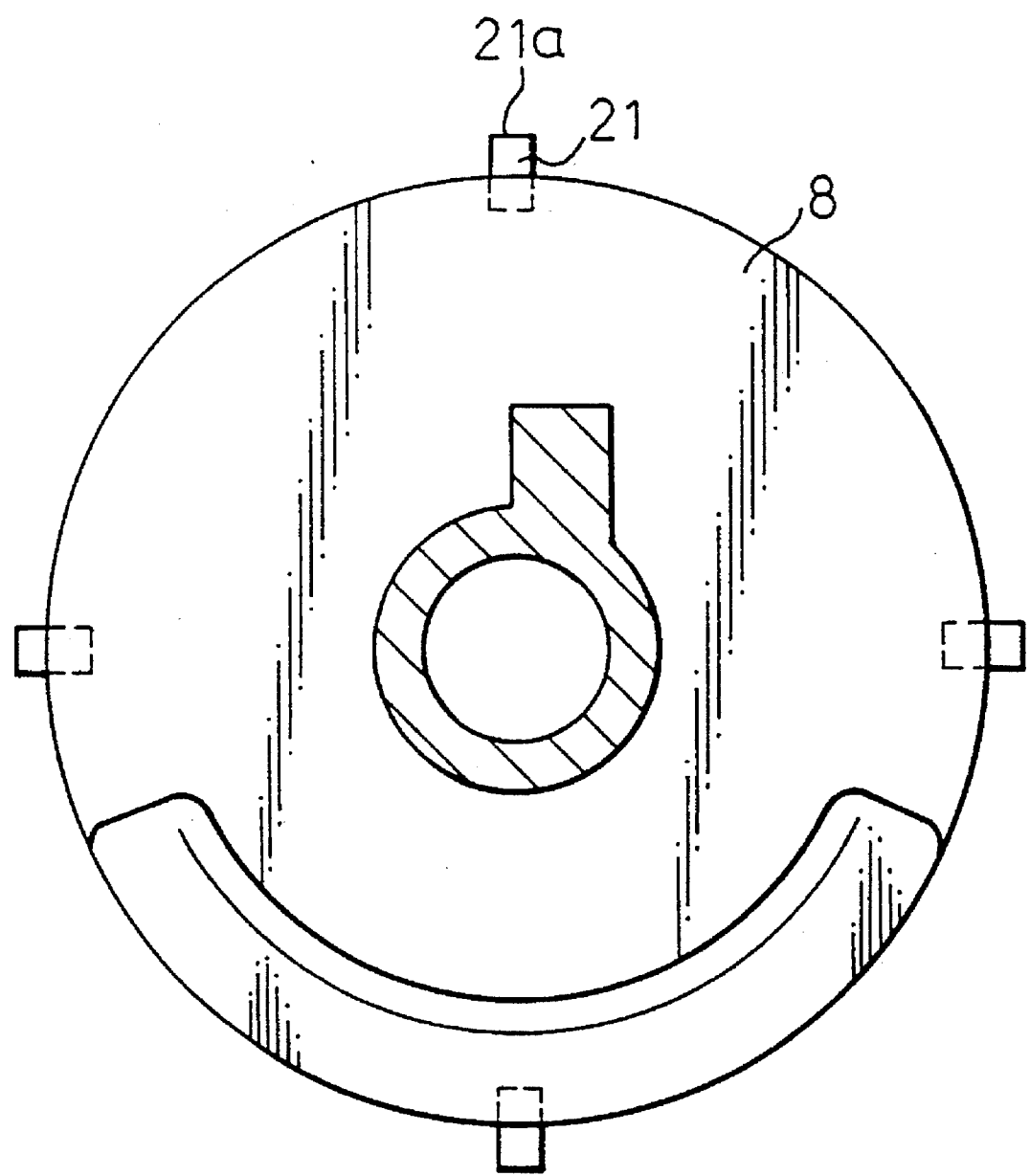
FIG. 7 is a partially cross-sectional, front view of the rotatable base member of FIG. 6.

FIGS. 6 and 7 show the second embodiment of the present invention. The fundamental structure is similar to that of the previous embodiments. Briefly, the compressor comprises a cylinder block 1, a front housing 2, and a rear housing 3 fastened together by fastening bolts 14. The compressor also comprises a drive shaft 7, a circular rotatable base member 8, a swash plate 11, and a wobble plate 13. Connecting rods 17 connect the wobble plate 12 and each of the pistons 16 to effect compression work. A magnetic sensor 18 is arranged on the front housing 2 around the head of the fastening bolt 14.

In this embodiment, four permanent magnets 21 are attached to the periphery of the rotatable base member 8 so that poles 21a of the permanent magnets 21 are directed radially outwardly. It will be understood that a magnetic circuit is formed from the permanent magnets 21 to the fastening bolt 14 and the rotation of the compressor can be detected in a manner described above. In this case, it is preferable to make the rotatable base member 8 or a portion thereof embracing the permanent magnets 21 from a nonferromagnetic material to prevent a magnetic flux occurring from the permanent magnets 21 from leaking through the rotatable base member 8.

Figure 8:
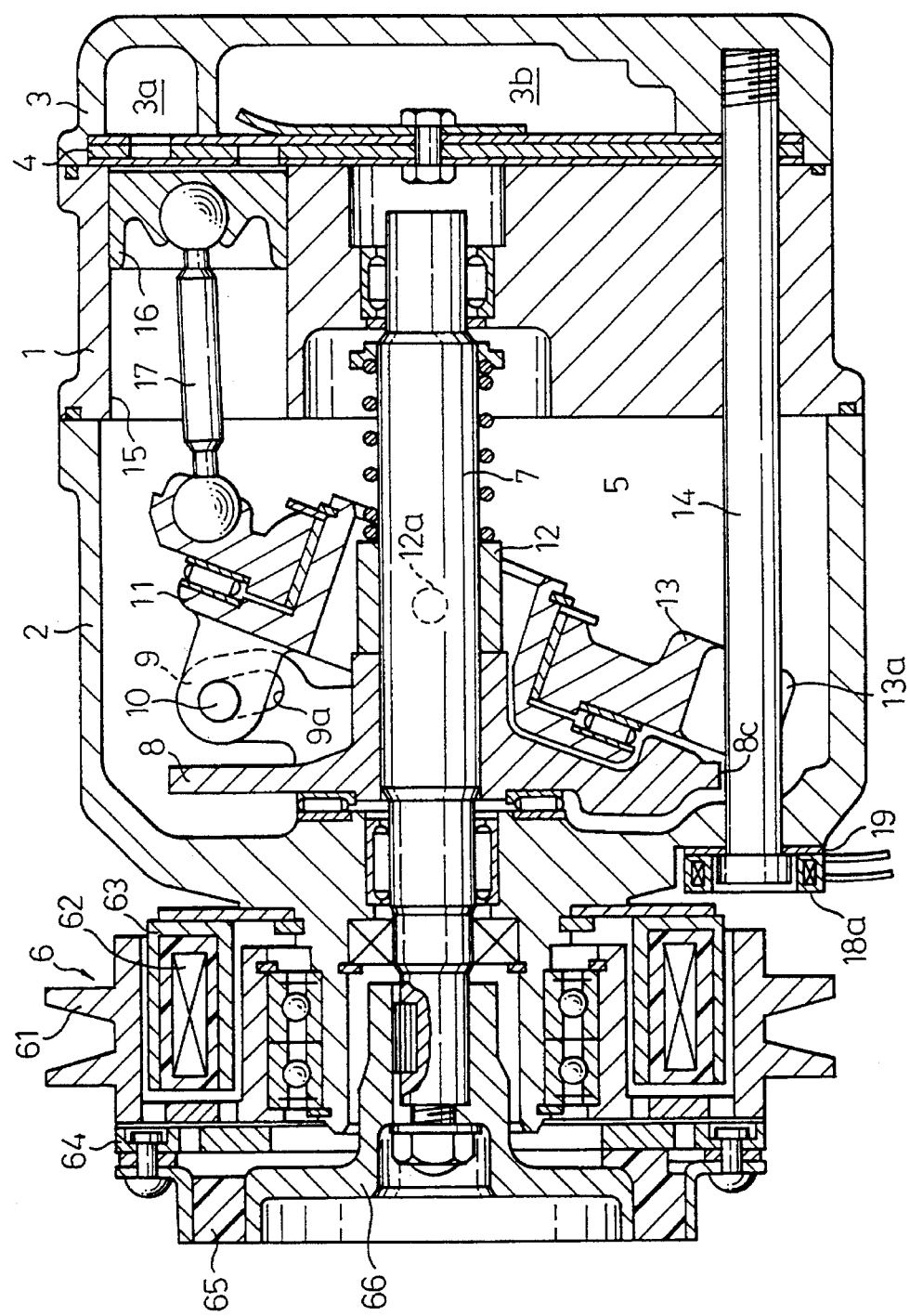
FIG. 8 is a cross-sectional view of a compressor according to the third embodiment of the present invention.
Figure 9:
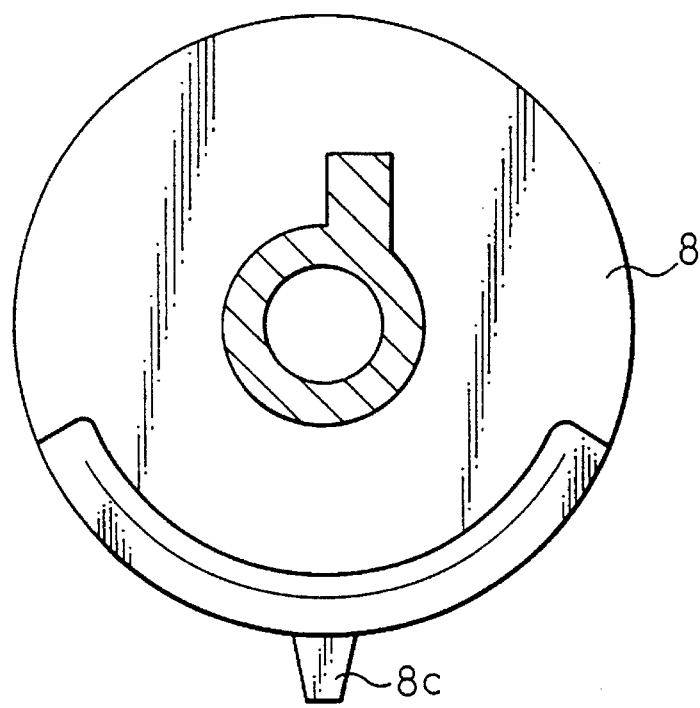
FIG. 9 is a partially cross-sectional, front view of the rotatable base member of FIG. 8.
Figure 10:
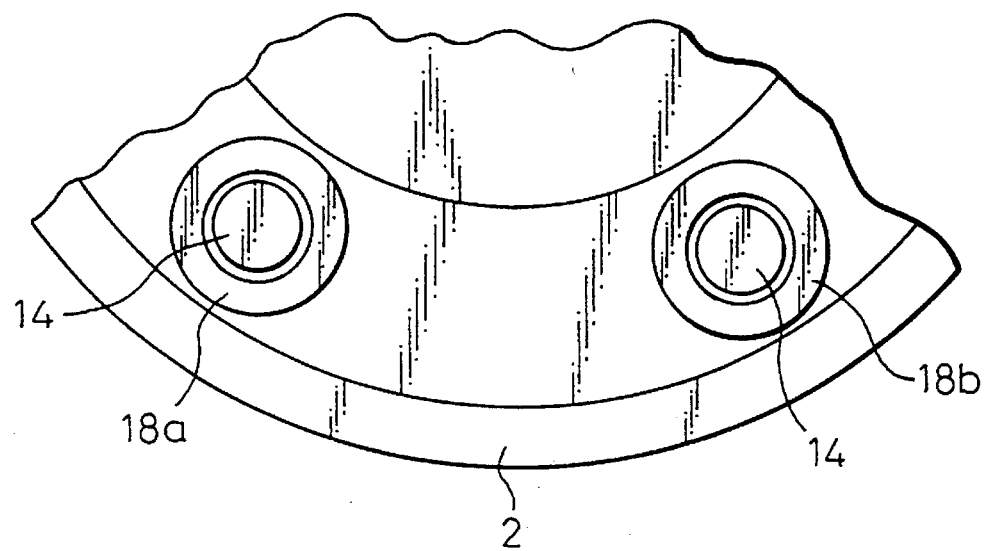
FIG. 10 is a partial enlarged front view of the casing of the compressor of FIG. 8.

FIGS. 8 to 10 show the third embodiment of the present invention. The fundamental structure is similar to that of the previous embodiments. That is, the compressor comprises a cylinder block 1, a front housing 2, and a rear housing 3 fastened together by fastening bolts 14. The compressor also comprises a drive shaft 7, a circular rotatable base member 8, a swash plate 11, and a wobble plate 13. Connecting rods 17 connect the wobble plate 12 and reach of the pistons 16 to effect compression work.

In this embodiment, two magnetic sensors 18a and 18b are arranged on the front housing 2 around the heads of two fastening bolts 14, respectively. The rotatable base member 8 has a projection 8c on the periphery thereof so that a magnetic circuit is formed from the magnetic clutch 6, through the rotatable base member 8 to each of the fastening bolt 14, and the rotation of the compressor can be detected by each of the magnetic sensors 18a and 18b in a manner described above.

The magnetic sensor 18a detects a magnetic flux ΦL1 passing through the fastening bolt 14 with which the magnetic sensor 18a cooperates; a magnetic flux ΦL1 increases when the projection 8c approaches the fastening bolt 14 and decreases when the projection 8c leaves that fastening bolt 14. Accordingly, the magnetic sensor 18a outputs a signal voltage Vs1 during one cycle of the rotation. The magnetic sensor 18b detects similar a magnetic flux ΦL2 passing through the adjacent fastening bolt 14 out of phase after the timing of 60 degrees from the detection of the magnetic sensor 18a and outputs a signal voltage Vs2. The signal voltage Vs1 advances at a phase of 60 degrees relative to the signal voltage Vs2.

Figure 11:
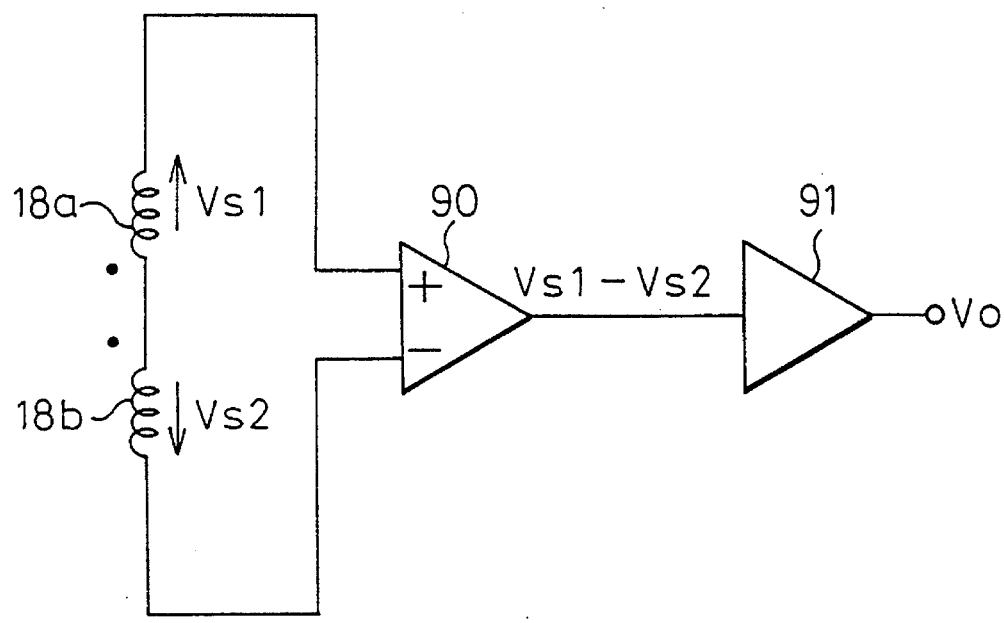
FIG. 11 is a diagram illustrating an example of a detecting circuit of FIG. 8.

The magnetic sensors 18a and 18b are connected in series but the directions of the signal voltage Vs1 and Vs2 are reversed, as shown in FIG. 11. The outer ends of the connected magnetic sensors 18a and 18b are connected to an operational amplifier 90 an output voltage of which is input to a comparator 91 having a hysteresis, the comparator 91 outputting digitized signal pulse voltages Vo.

Figure 13:
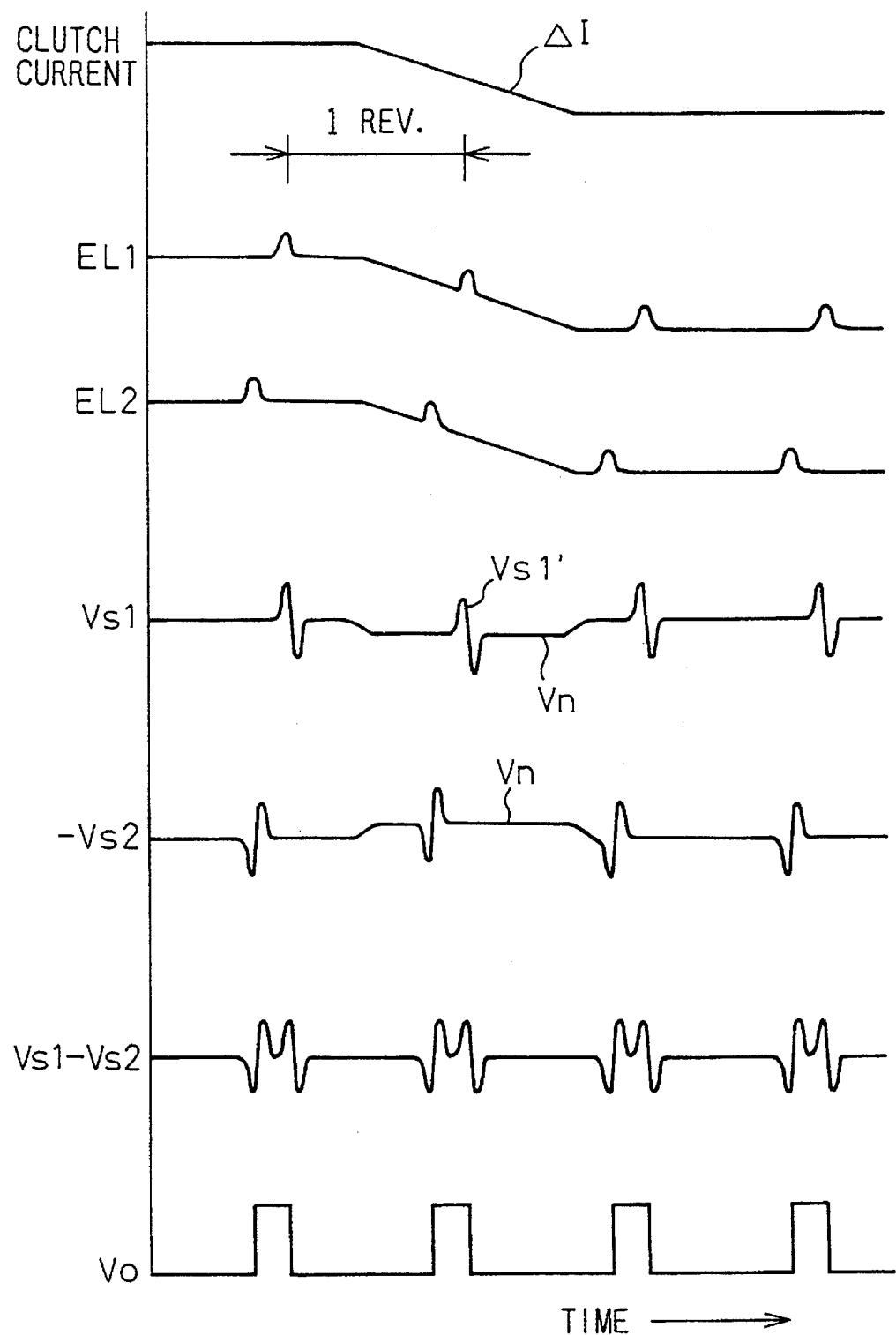
FIG. 13 is a timing chart illustrating wave forms of signals in the circuit of FIG. 11.

By this arrangement, noise voltages Vn appearing in the respective signal voltage Vs1 and Vs2 due to a change in current ΔI of the magnetic clutch 6 are offset each other, and only a component of the difference of the signal voltages Vs1 and Vs2 is digitized by the comparator 91, as shown in FIG. 13. Accordingly, it is possible to prevent a reduction of the S/N ratio due to the noise voltages Vn in phase and an occurrence of an incorrect operation can be avoided.

In comparison to this arrangement, when the signal voltage Vs1 of the single magnetic sensor 18a is digitized, the level of a signal voltage component Vs1' is shifted toward one side due to a superposition of the noise voltage Vn, as shown in FIG. 13, and a noise margin during digitizing is reduced. The operational amplifier 90 and the comparator 91 constitute a detecting circuit means for detecting a difference between outputs from the pair of the magnetic sensors 18a and 18b to thereby detect at least one of the rotation and the rotational angle of the rotatable member in response to the difference.

It is possible to use any combination of two fastening bolts 14, but preferably, two adjacent fastening bolts 14 will be used to arrange the magnetic sensors 18a and 18b to offset any magnetic noise except for the magnetic clutch 6.

In addition, it is certainly possible to detect the rotational angle by dividing one cycle determined from the signal pulse voltages Vo.

Figure 14:
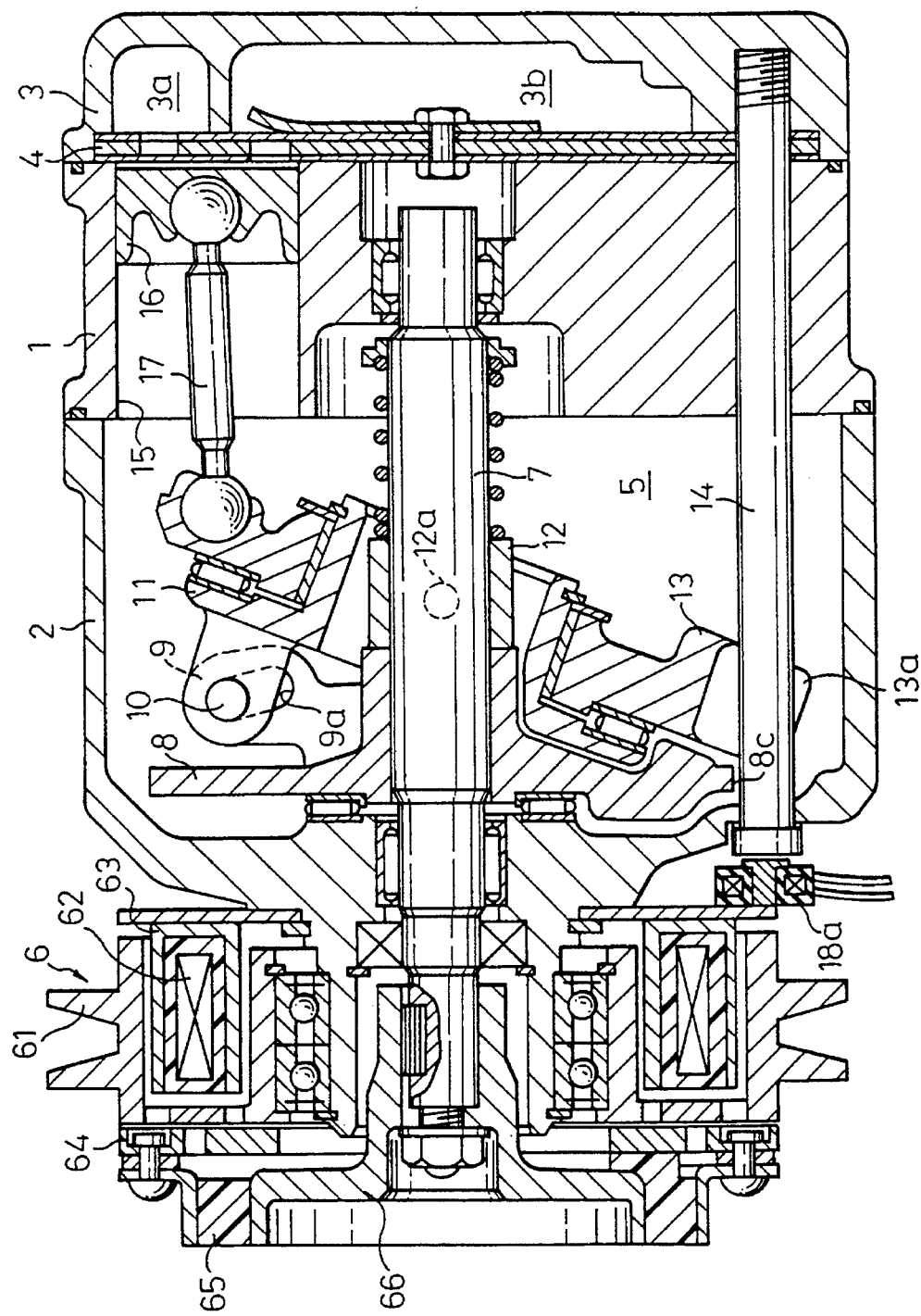
FIG. 14 is a cross-sectional view of a modified compressor similar to the compressor of FIG. 8.

In the modified embodiment shown in FIG. 14, magnetic sensors 18a and 18b are carried by the stator 63 of the magnetic clutch 6 so as to face the heads of the fastening bolts 14, respectively.

Figure 12:
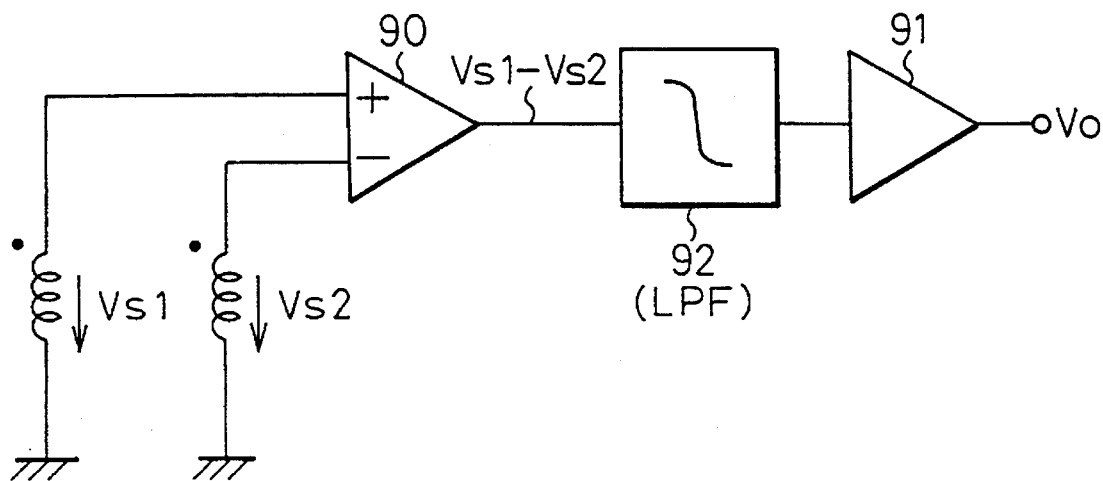
FIG. 12 is a diagram illustrating another example of a detecting circuit.

In the modified embodiment shown in FIG. 12, respective one ends of the magnetic sensors 18a and 18b are grounded so that the directions of the signal voltage Vs1 and Vs2 are identical, and the respective other ends of the magnetic sensors 18a and 18b are connected to an operational amplifier 90 which in turn is connected to a comparator 91. In this arrangement too, it is possible to offset the noise voltages in phase each other, and to detect a difference of the signal voltages Vs1 and Vs2.

It is also possible to amplify the signal voltages of the magnetic sensors 18a and 18b by a differential amplifier and then to detect the difference therebetween.

We claim:

1. A compressor comprising a casing including a plurality of casing members hermetically fastened by a plurality of fastening means having a portion inside and a portion outside of the casing; means for introducing a fluid to be compressed into the compressor; means for collecting a compressed fluid and passing the compressed fluid from the compressor and compressing means comprising means for compressing a fluid a drive shaft inserted into the casing for rotation therein and operatively connected to a drive source by means of a magnetic clutch, said drive shaft having arranged thereon and magnetically coupled thereto a rotatable member having a periphery for rotation with said drive shaft, said drive shaft and rotatable member comprised at least partly of a ferromagnetic material and said means for compressing the fluid operatively arranged with said drive shaft, the improvement which comprises:

forming a non-uniform magnetic field at the periphery of the rotatable member comprising magnetic flux leaking from the magnetic clutch along the drive shaft to said rotatable member, said rotatable member being arranged to form a magnetic circuit with the portion of the fastening means inside the casing, a magnetic flux detecting means arranged outside the casing near the portion of said fastening means outslide of the casing whereby said magnetic flux detecting means detects the magnetic flux at the portion of the fastening means outside the casing, said magnetic flux changing with rotation of said rotatable member and means for receiving a signal from said flux detecting means for determining rotation of the rotatable member from the changes in the magnetic flux.

2. The compressor of claim 1 wherein the non-uniform magnetic field at the periphery of the rotatable member is formed by at least one radial projection at the periphery of said rotatable member.

3. The compressor of claim 1 wherein the non-uniform magnetic field at the periphery of said rotatable member is formed by at least one notch in the periphery of said rotatable member.

4. The compressor of claim 1 wherein the non-uniform magnetic field at the periphery of said rotatable member is formed by at least one permanent magnet fixed to said rotatable member.

5. A compressor according to claim 1, wherein fastening means comprises at least one bolt with a head constituting the outer portion, and the detecting means comprises a magnetic transducer arranged on the casing so as to surround the head.

6. The compressor of claim 4 wherein the non-uniform magnetic field at the periphery of said rotatable member is formed by the at least one permanent magnet projecting radially from the periphery of said rotatable member.

7. The compressor of claim 1 wherein the magnetic flux detecting means comprises a first magnetic flux detecting means arranged near the portion of a first fastening means outside of the casing and a second magnetic flux detecting means arranged near the portion of a second fastening means outside of said casing.

* * * * *